United States Patent [19]
Weiss et al.

[11] Patent Number: 5,361,062
[45] Date of Patent: Nov. 1, 1994

[54] PERSONAL SECURITY SYSTEM

[75] Inventors: Kenneth P. Weiss, Newton, Mass.; Sheldon Howard, Canoga Park, Calif.

[73] Assignee: Security Dynamics Technologies, Inc., Cambridge, Mass.

[21] Appl. No.: 981,808

[22] Filed: Nov. 25, 1992

[51] Int. Cl.⁵ ............................................... H04Q 1/00
[52] U.S. Cl. .................... 340/825.330; 340/825.31; 380/23; 380/48; 235/382
[58] Field of Search ................. 340/825.33, 825.31, 340/825.34; 380/21, 23, 48; 235/382

[56] References Cited

U.S. PATENT DOCUMENTS

| | | | |
|---|---|---|---|
| 3,806,874 | 4/1974 | Ehrat | 340/149 |
| 4,145,568 | 5/1979 | Ehrat | 178/22 |
| 4,295,039 | 10/1981 | Stuckert | 235/380 |
| 4,471,216 | 9/1984 | Herve | 235/380 |
| 4,509,093 | 4/1985 | Stellberger | 361/172 |
| 4,599,489 | 7/1986 | Cargile | 178/22.8 |
| 4,609,777 | 8/1986 | Cargile | 178/22.08 |
| 4,720,860 | 1/1988 | Weiss | 380/23 |
| 4,731,841 | 3/1988 | Rosen et al. | 380/23 |
| 4,819,267 | 4/1989 | Cargile et al. | 380/23 |
| 4,849,613 | 7/1989 | Eisele | 235/379 |
| 4,856,062 | 8/1989 | Weiss | 380/23 |
| 4,885,778 | 12/1989 | Weiss | 380/48 |
| 4,924,516 | 5/1990 | Bremer | 380/48 |
| 4,928,098 | 5/1990 | Dannhaeuser | 340/825.34 |
| 4,998,279 | 3/1991 | Weiss | 380/23 |
| 5,023,908 | 6/1991 | Weiss | 380/23 |
| 5,058,161 | 10/1991 | Weiss | 380/23 |
| 5,097,505 | 3/1992 | Weiss | 380/23 |
| 5,101,430 | 3/1992 | Periou | 340/825.34 |
| 5,206,905 | 4/1993 | Lee et al. | 380/23 |

OTHER PUBLICATIONS

McLellan, V., The Future of Data Security Looks Credit-Card Thin, Oct. 7, 1985, pp. 24–30, Information Week.

Racal-Guardata, Apr. 1989, Bulletin RG500 Sytek, PFX Identity Authentication System.

*Primary Examiner*—Donald J. Yusko
*Assistant Examiner*—Brian Zimmerman
*Attorney, Agent, or Firm*—Wolf, Greenfield & Sacks

[57] ABSTRACT

A method and apparatus are provided for verifying the identity of a system user. Each user has a token which processes an inputted seed to generate a stored value which is either a current seed value or a function thereof. This value is then changed to generate a new current seed in response to each of a plurality of selectively generated trigger signals. The stored current seed or a selected function thereof is outputted, for example by being displayed on the token, and is received and inputted into a host verification unit. This unit either has or generates the current seed value (and the outputted function thereof where required) for the user, the user being indicated by an input also provided to the host with the token output, and compares the received and generated seed function values to verify the user.

14 Claims, 2 Drawing Sheets

PERSONAL SECURITY SYSTEM

FIELD OF THE INVENTION

This invention relates to a method and apparatus for verifying the identity of a system user and more particularly to security systems for permitting access to a computer, financial account or other facility for which it is required that access be limited over a telephone or other suitable remote or local input device.

BACKGROUND OF THE INVENTION

In business, government and academia, there are many applications where it is desired that only a select group of identified individuals have access to a particular facility. Examples are obtaining classified or other sensitive data from a computer data base, placing orders or transacting other business with a bank, brokerage or other financial institution and the like. In such applications, each user is normally assigned a secret code number which the individual provides to the system to verify his identity.

While such code responsive systems provide some measure of security, this security is limited in that hackers can normally break a fixed code within a limited period of time. Sophisticated devices are also available for tapping phone lines to gain access to fixed authorization codes and such codes may also be obtained from or misused by people in an organization who have rightly or wrongly obtained such numbers.

Therefore, more sophisticated techniques for providing secure access in these various applications have been developed. Some of these techniques involve two-factor security, where the user has both a token and a number so that knowing the number alone will not provide access. The token is frequently a "smart-card" which may operate in a query-response mode with a host computer to assure verification. Alternatively, such smart-card may provide an authorization number which dynamically varies with time, with number of uses or the like to prevent successful hacking of a user ID number. However, most such systems are relatively complex, and therefore expensive. Some of the systems, particularly query and response systems, are also cumbersome to use.

A need therefore exists for a simple, relatively inexpensive, easy to use personal security system for providing a dynamically varying, non-predictable number for an individual.

SUMMARY OF THE INVENTION

In accordance with the above, this invention provides a token for each user and a central verification unit. The central verification unit would typically be at the location where the data base to which access is being sought is located, where financial transactions are being consummated or the like. Each token has a processor to which a unique input number or seed is applied. The processor contains an algorithm for operating on this seed to generate a pseudorandom seed number. A clock or other means for periodically generating a trigger signal is provided, with the processor being responsive to the trigger signal for utilizing a value which is a predetermined function of each current seed number as an input to generate a new pseudorandom seed number. For a preferred embodiment, the current seed number is the input to the processor for generating each new seed number. At least a portion of each current seed number is either directly displayed or otherwise provided as an output from the token or is processed in a predetermined way before being utilized as an output.

The verification unit has a means for receiving a user identification and the outputted portion of each seed number or other output from the token. This means may for example be a keyboard, a modem or touchtone decoder receiving telephone inputs from a remotely located user or other suitable input device. The verification device uses the user identification to cause the current seed number for the user to be generated and then compares the received output portion of the current seed number with the corresponding portion of the generated seed number (or compares processed portions of such seed numbers) to verify the user.

The token may be a card having a display of for example a selected number of least significant digits for the seed number and the display may also display a fixed identification number for the token or user. Instead of using the current seed number as the input to the processor, such input may be an intermediate function which occurs in the generation of the current seed number, a selected portion of the current seed number or the like.

At the verification unit, seed numbers for each user on the system are stored along with an indication of when such seed number was current. A processor is provided for processing the stored seed number for the selected user and for processing successively generated seed numbers, the processing with successive seed numbers being performed the number of times required to bring the seed number current when a verification is required. To reduce the number of computations required to bring the seed number current for a given verification, the processor is preferably operated at selected times, for example at off hours, to generate the current seed number for all users on the system. Such updating of seed numbers may for example occur once a day at off hours, or may occur periodically when the processor is not otherwise being utilized, the update being interrupted when a verification is to be performed or when the processor is otherwise to be utilized.

The foregoing and other objects, features and advantages of the invention will be apparent from the following more particular description of a preferred embodiment as illustrated in the accompanying drawings.

IN THE DRAWINGS

DETAILED DESCRIPTION

Figure 1:
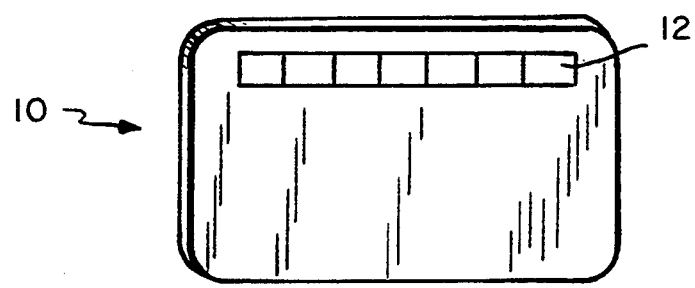
FIG. 1 is a representation of a card or token suitable for use with this invention.

FIG. 1 illustrates one form which the token of this invention may take. In FIG. 1, the token is shown as a card 10 which is generally about the size of a standard credit card, but slightly thicker. The card contains a multi-digit display 12. As will be discussed later, card 10 also contains a processor and other circuitry, cards of this type sometimes being referred to as "smart-cards".

Figure 2:
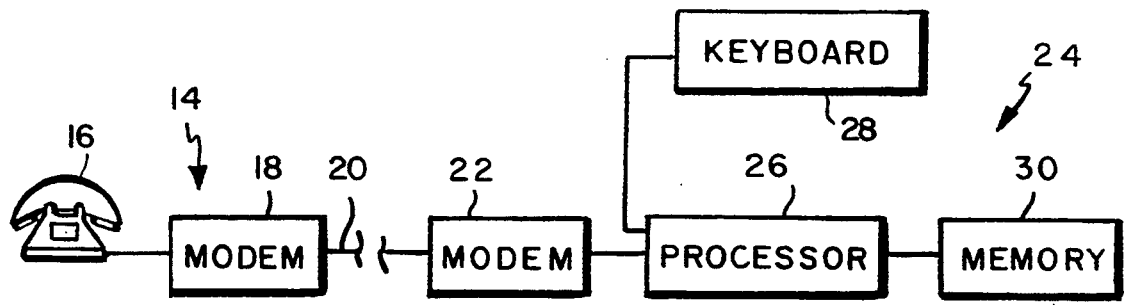
FIG. 2 is a schematic block diagram of a system in which this invention may be utilized.

FIG. 2 illustrates a system in which the teaching of this invention may be utilized. A user, having token 10, could be at a remote location 14 having a telephone 16 and modem 18. Modem 18 communicates over standard telephone lines 20 to a modem 22 located at a central location or host 24. Modem 22 is one input to a processor 26, keyboard 28 being an additional input to the processor. Processor 26 may, for example, control access to a memory 30 containing a secure data base or may control access to other facilities or services (i.e. cellular phone) at host 24.

In operation, a user places a call from remote location 14 to central station 24 over telephone lines 20. The user then inputs the number appearing on display 12 of his card 10 through telephone 16 and this number is communicated through modem 18, lines 20 and modem 22 to processor 26. Where host 24 contains a touch-tone decoder, touch-tone inputs from telephone 16 may be communicated directly to processor 26 without the need for modems 18 and 22.

As will be discussed later, the number on display 12 may include a fixed identification number for the user or the user may separately input such an identification number, either before or after inputting the number appearing on display 12. Processor 26 uses the user identification number to retrieve a seed number for the user and then updates this seed number to its current value. The updated seed number, or a selected portion thereof, for example the N least-significant digits thereof, are then compared with the number inputted by the user. If processor 26 determines that these numbers match, the user is granted access to for example selected information contained in memory 30. Alternatively, the user may be permitted to complete various financial transactions or may be permitted to utilize processor 26 in other ways, including gaining access to various services.

Further, while the security system of this invention is particularly adapted for use over telephone lines, the number appearing on card 10 could also be inputted into processor 26 via keyboard 28. Where the number generated by card 10 is generated in machine readable form, access to processor 26 may be obtained by inserting the card in a suitable reading device which is attached as an input to processor 26. Other means known in the art for inputting data from a token or card 10 into processor 26 might also be utilized.

Figure 3A:
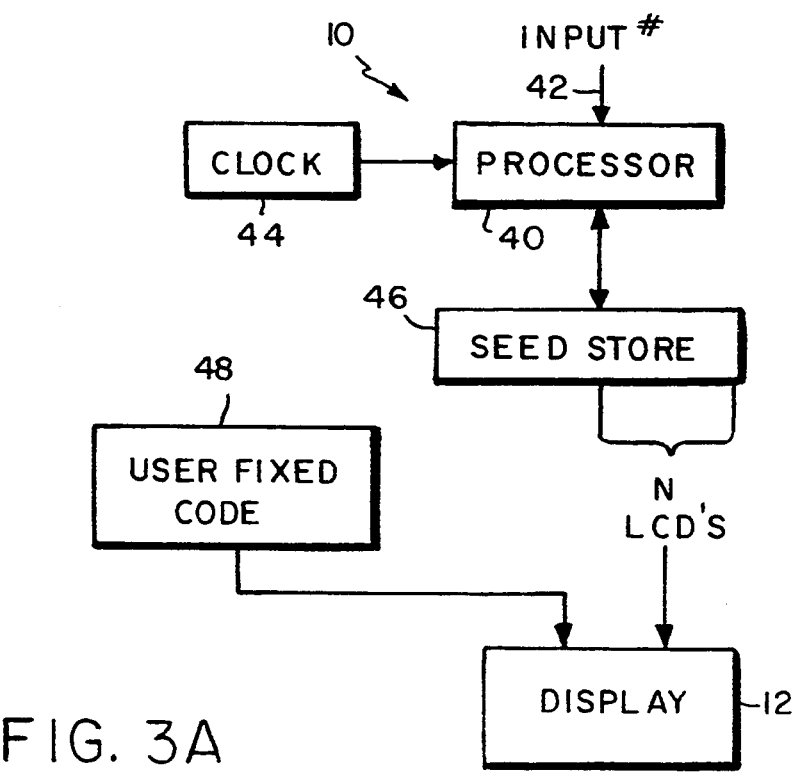
FIG. 3A is a schematic block diagram of a token circuit suitable for use in the preferred embodiment of the invention.

FIG. 3A is a block diagram illustrating an exemplary circuit for card 10. From this figure, it is seen that card 10 has a processor 40 with an external input 42. A clock 44 also provides an input to processor 40. A seed store 46 is loaded from processor 40 and also provides inputs to the processor. The N least-significant digits, for example the four or five least-significant digits, of the number stored in store 46 are applied to control a corresponding number of digits of display 12. A fixed user code is stored in a register 48 and is utilized to control the remaining digits of display 12. In some applications, the number displayed on display 12 may have the fixed code in its most significant digit positions and the digits from seed store 46 in its least significant digit positions. Alternatively, the significant digit position of the digits from seed store 46 and fixed code store 48 may be reversed or these digits may be interleaved in some predetermined manner, hashed, binary rotated or otherwise processed to make it more difficult for one intercepting the code to distinguish the fixed code and randomly varying code digits. Similarly, the seed stored in store 46 may be shifted or otherwise processed before being utilized either as an input to processor 40 or to control the output. Further, instead of a multidigit output 12, a single digit output might be employed, for example a numeric audio synthesizer or an RF coded signal generator, with the values in stores 46 and/or 48 being shifted to sequentially present digits of the coded output.

In operation, a multi-digit number is initially inputted into processor 40, for example a 32 bit random number, in a manner known in the art. Typically, this number, which is derived from a processor, for example processor 26, as a result of running some randomization routine is unique for each user. However, this is not a limitation on the invention since the initial number dynamically changes with time. Therefore, even if two users initially receive the same seed number, the current seed numbers for such individuals will not be the same so long as they receive the numbers at different times. The generating processor can assure that two users do not receive the same number within the same time cell and can, if desired, assure that two users do not receive the same seed number at all. Typically, the seed number would be loaded into processor 40 prior to the processor being encapsulated in card 10. If this is not done, then the loading of the seed would be accomplished utilizing some type of RF, ultrasonic, magnetic, electronic or other input device for loading information into a processor. The seed loaded into processor 40 may be stored in seed store 46 or, with a suitable input device, the seed may be loaded directly into seed store 46.

The inputted value is processed in processor 40 in accordance with a predetermined algorithm. For example, the initially loaded number may be multiplied by a second large number, the resulting large number may then be mathematically modified a number of times to achieve the final value.

Periodically, clock 44 generates an output to processor 40 which triggers the generation of a new seed value. The new seed value is generated by taking either the existing seed value stored in seed store 46, a portion of such seed value, an intermediate function used in generating such seed value, a shifted or processed form of the seed value or some other function of such seed value and applying it as an input to processor 40. Processor 40 then utilizes the inputted value in the algorithm discussed above to generate the new seed value. For the preferred embodiment shown in FIG. 3A, the input to processor 40 for generating the new seed value is the current seed value stored in seed store 46.

Figure 3B:
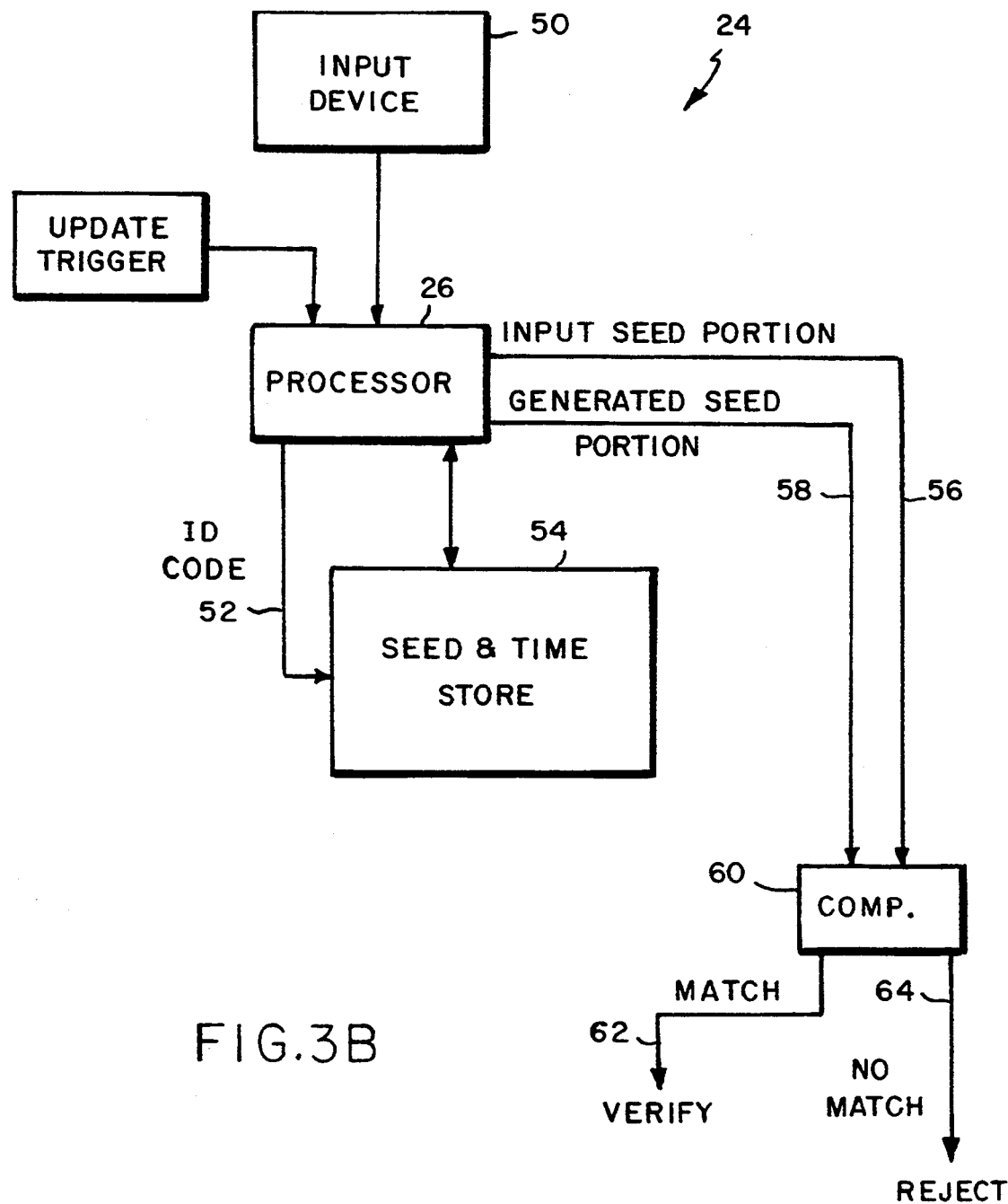
FIG. 3B is a schematic block diagram of a verification device suitable for use in this invention.

FIG. 3B illustrates an exemplary circuit at the verification unit or host 24. From this figure it is seen that processor 26 receives an input from an input device 50 which may, for example, be modem 22, keyboard 28 or some other suitable input device. The input to processor 26 for the preferred embodiment has two portions, a fixed ID code and a variable seed portion. Processor 26 outputs the fixed ID portion of the code on line 52 as an address input to seed and time store 54. Thus, the signal on line 52 causes the most recently stored seed for the user and the time at which such seed was current to be read out from store 54 into processor 26. Processor 26 then performs a computation using the seed number, a portion of the seed number or an intermediate value produced in generating the seed number, using the same algorithm as was used by processor 40, to generate a new seed number. The stored time value is counted up or counted down in processor 26 each time a new seed value is computed and this process is repeated with the successively generated seed values (or the selected function thereof) being utilized as the seed input to processor 26 until it is determined by counting up or counting down the stored time value that the computed seed value is the current seed value.

At that time, processor 26 outputs the seed portion of the received input on line 56 and outputs the corresponding portion of the current generated seed value on line 58. Lines 56 and 58 are connected as inputs to comparator 60. If the values on lines 56 and 58 are equal, comparator 60 generates a match output on line 62 indicating that the user has been verified. The signal on line 62 may be utilized in manners known in the art to afford a user access to a data base, to permit the user to engage in certain transactions, or for other suitable purposes. If the values on lines 56 and 58 do not match, comparator 60 generates a reject output on line 64. The output on line 64 may be applied to processor 26 to cause the processor to provide the user with a reject prompt, permitting the user one more try to gain access to the system. Typically, processor 26 will lock the user out of the system in response to a second reject output on line 64.

While in the discussion above, the user is identified to the system by the fixed user code appearing on display 12, such a system provides only one factor security, namely something the user has. Therefore, someone improperly coming into possession of the token 10 would be able to gain access to information in memory 30 or to accomplish the other functions permitted in response to a verification determination. Security could be enhanced by providing two-factor security. To accomplish this, the user fixed code would not be displayed on display 12, but would instead be a secret personal identification code (PIN) known only to the user. Display 12 would contain only a selected number of digits from seed store 46. These digits could be the 5 to 10 least significant digits of the seed value or could be any selected digits of this value. For example, where the seed had 32 digits, display 12 could have the least significant odd digits or the least significant even digits of this value, or could have some random combination of the stored seed. All that is required is that processor 26 know the digits of the seed which appear on display 12 and thus the digits of the generated current seed number which need to be compared in comparator 60.

Where the user fixed code is not part of the display on display 12, the user would input his PIN to input device 50 either before or after inputting the seed number appearing on display 12. Processor 26 would then output this PIN value on line 52 as the address input to seed and time store 54. The system would otherwise operate as previously described. However, with this mode of operation, a person improperly in possession of token 10 would be unable to be verified for access to the system without also knowing the authorized user's secret PIN. A higher level of security would thus be obtained.

Further, while the trigger for updating processor 40 is shown as being a clock 44 which might generate trigger outputs at 1 minute, 10 minute, or other suitable time intervals, other triggering techniques could be employed. For example, display 12 might normally not be illuminated to save power and a pressure sensitive switch might be provided on token 10 which the user presses to cause illumination of the display when the user wishes to gain access to the system. The release of such pressure-sensitive switch could be the trigger for causing a new seed value to be generated. However, if the user did not make an access to processor 26 each time such switch were operated, it would be possible for token 10 and verification unit 24 to get out of synchronization, thus preventing verification. This problem would be overcome by storing the number of seed changes between each output and combining them with the outputted code.

It is also possible for the host and token to be out of sync where triggering is in response to a clock output. While this will generally not be a problem, it can cause a lack of verification near times at which triggering occurs. This problem may be overcome by transmitting at least a portion of the clock value, for example the minutes reading, with the coded value from the token. This permits the host processor to track drifts and to compensate for synchronization errors by use of an appropriate algorithm. For example, with a mismatch of less than 30 seconds (with minutes transmitted), the host value is adjusted to zero the difference, while the host value is adjusted to the nearest minute for mismatches greater than 30 seconds.

The token for the various embodiments discussed above would typically employ a programmed microprocessor to perform and control the various functions, with display 12 typically being a liquid crystal display. However, special purpose circuitry or other suitable hardware and/or software would also be employed. Similarly, host 24 could be a programmed computer dedicated to the function, a programmed portion of a larger computer used to perform other functions, special purpose hardware or other suitable hardware and/or software.

Thus, while the invention has been described above with respect to a preferred embodiment, and a number of alternatives to the preferred embodiment have been discussed, it is apparent that such embodiment and variations are for purposes of illustration only and that the foregoing and other changes in form and detail may be made in the invention by one skilled in the art without departing from the spirit and scope of the invention.

What is claimed is:

1. A security system for verifying the identify of a user comprising:

a token associated with each user, said token having means for receiving a selected input value, means for processing said input value to generate a pseudo-random seed, means for storing the generated pseudo-random seed, means for generating a trigger signal at selected times, means responsive to each trigger signal for utilizing a value which is a predetermined first function of the stored pseudo-random seed as an input to said means for processing to cause the means for processing to generate a new pseudo-random seed which is stored in the means for storing in place of the seed previously stored therein, and means for providing an output which is a second function of at least a portion of the stored seed; and a verification unit having means for receiving a user identification and the token output, means responsive to the user identification for generating the second function for the seed which should be stored in the token for the user, and means for comparing the received outputting function of the stored seed with the corresponding generated function of the seed to verify the identify of the user.

2. A system as claimed in claim 1 wherein said second function is at least a portion of the stored seed.

3. A system as claimed in claim 2 wherein said token is a card having a display, and wherein said means for providing an output displays the at least a portion of the current stored seed on said display.

4. A system as claimed in claim 3 wherein each user has a fixed identification code, and including means for also displaying the fixed identification code on the display.

5. A system as claimed in claim 1 wherein said means for generating a trigger signal includes a clock, and means for generating trigger outputs from said clock at selected time intervals.

6. A system as claimed in claim 1 wherein the input to the means for processing for the generation of each new pseudo-random seed is the current seed.

7. A system as claimed in claim 1 wherein the input to the means for processing for the generation of each new pseudo-random seed is an intermediate function in the generation of the current seed.

8. A system as claimed in claim 1 wherein the input to the means for processing for the generation of each new pseudo-random seed is a selected portion of the current seed.

9. A system as claimed in claim 1 wherein said means for generating the second function at the verification unit includes means for storing a seed for each user on the system and for storing an indication of the number of triggerings since such seed was current, and means for iteratively processing, with said stored seed being processed for the first iteration and each succeeding generated seed being processed for the subsequent iterations, the number of processing iterations being that required to bring the seed to that which should be stored in the token.

10. A system as claimed in claim 9 wherein said verification unit includes means operative at selected times to update the seeds for users on the system.

11. A system as claimed in claim 10 wherein said verification unit includes means operative at selected times for utilizing the means to update to generate the current seed for each user on the system.

12. A system as claimed in claim 1 wherein said token includes means for transmitting synchronization data with the outputted function.

13. A system as claimed in claim 12 wherein said means for generating a trigger signal includes a clock, and means for generating trigger outputs from said clock at selected time intervals, and wherein said synchronization data is at least a portion of the current clock output.

14. A method for verifying the identity of a system user comprising the steps of:

providing an output from a token associated with the user which is a predetermined function of at least a portion of a stored seed, said providing step including the steps performed at said token of receiving a selected input code, processing said input code to generate a pseudo-random seed, storing the pseudo-random seed, generating a trigger signal at selected time intervals, operating in response to each trigger signal to utilize a value which is a predetermined first function of each stored seed as an input to said processing step, said processing step generating a new pseudo-random seed as a result thereof which is stored in place of the previously stored seed, the outputted function being a second function of at least a portion of each stored seed; and verifying the identity of the user at a verification unit, said verifying step including the steps performed at said verification unit of receiving a user identification and the token output, generating the second function of the seed which should be stored for the user with the token, and comparing the received outputted second function of the stored seed with the corresponding generated second function of the seed to verify the identity of the user.

* * * * *